United States Patent
Bleckert et al.

(10) Patent No.: US 8,848,690 B2
(45) Date of Patent: Sep. 30, 2014

(54) METHOD AND COMMUNICATION SYSTEM FOR AUTOMATICALLY DISCOVERING THE MULTIMEDIA SERVICE CAPABILITY

(75) Inventors: Peter Bleckert, Uppsala (SE); Mats Stille, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1451 days.

(21) Appl. No.: 10/596,892

(22) PCT Filed: Dec. 30, 2003

(86) PCT No.: PCT/SE03/02099
§ 371 (c)(1),
(2), (4) Date: Jun. 28, 2006

(87) PCT Pub. No.: WO2005/064958
PCT Pub. Date: Jul. 14, 2005

(65) Prior Publication Data
US 2007/0097879 A1 May 3, 2007

(51) Int. Cl.
| H04L 12/66 | (2006.01) |
| H04Q 3/00 | (2006.01) |
| H04M 7/00 | (2006.01) |
| H04W 4/16 | (2009.01) |
| H04W 8/22 | (2009.01) |
| H04W 8/18 | (2009.01) |
| H04L 29/06 | (2006.01) |
| H04M 1/725 | (2006.01) |
| H04M 3/42 | (2006.01) |
| H04W 76/04 | (2009.01) |
| H04W 8/24 | (2009.01) |

(52) U.S. Cl.
CPC ........... *H04Q 3/0045* (2013.01); *H04M 7/0024* (2013.01); *H04W 8/22* (2013.01); *H04W 8/18* (2013.01); *H04L 65/1016* (2013.01); *H04Q 2213/13098* (2013.01); *H04M 2203/2066* (2013.01); *H04Q 2213/13204* (2013.01); *H04M 1/72547* (2013.01); *H04Q 2213/13389* (2013.01); *H04M 7/0057* (2013.01); *H04M 2201/38* (2013.01); *H04Q 2213/13248* (2013.01); *H04Q 2213/13103* (2013.01); *H04M 3/42365* (2013.01); *H04Q 2213/13176* (2013.01); *H04Q 2213/13348* (2013.01); *H04W 76/04* (2013.01); *H04W 4/16* (2013.01); *H04W 8/245* (2013.01); *H04M 7/0072* (2013.01); *H04Q 2213/13345* (2013.01); *H04Q 2213/13106* (2013.01); *H04Q 2213/13383* (2013.01)
USPC .......................................... 370/352; 370/354

(58) Field of Classification Search
CPC ........................... H04L 12/5845; H04M 7/006
USPC ...................................................... 370/352, 354
See application file for complete search history.

(56) References Cited

U.S. PATENT DOCUMENTS 6,161,008 A 12/2000 Lee et al.
6,430,174 B1 * 8/2002 Jennings et al. .............. 370/352
(Continued)

*Primary Examiner* — Nafiz E Hoque

(57) ABSTRACT

The present invention relates to a method, a system and a server for automatically discovering the common Multimedia Service Capability, and computer program. This solution avoid unnecessary use of the radio interface and is based on making use of the circuit switched network, e.g. the Intelligent network IN, as trigger to the packet switched network to find out about the calling as well as the called user's multimedia capabilities during a voice call. If there is a positive capability discovery result out of this for both users, the network will send a message to each of the two mobile phones that they should notify the users e.g. by displaying an icon above a soft button. It can be that the phone displays a shared multimedia-Image icon, if this was the only commonly supported capability of both users, up to a whole range of more or less complicated SMM services.

16 Claims, 6 Drawing Sheets

(56) References Cited

U.S. PATENT DOCUMENTS

| | | |
|---|---|---|
| 6,577,718 B1 | 6/2003 | Kalmanek, Jr. et al. |
| 6,640,248 B1 | 10/2003 | Jorgensen |
| 7,031,706 B2 * | 4/2006 | Tuohimetsa et al. .......... 370/354 |
| 7,366,183 B1 * | 4/2008 | Sylvain .......................... 370/401 |
| 2004/0120498 A1 * | 6/2004 | Sylvain ..................... 379/221.01 |
| 2005/0083909 A1 * | 4/2005 | Kuusinen et al. ............. 370/352 |

* cited by examiner

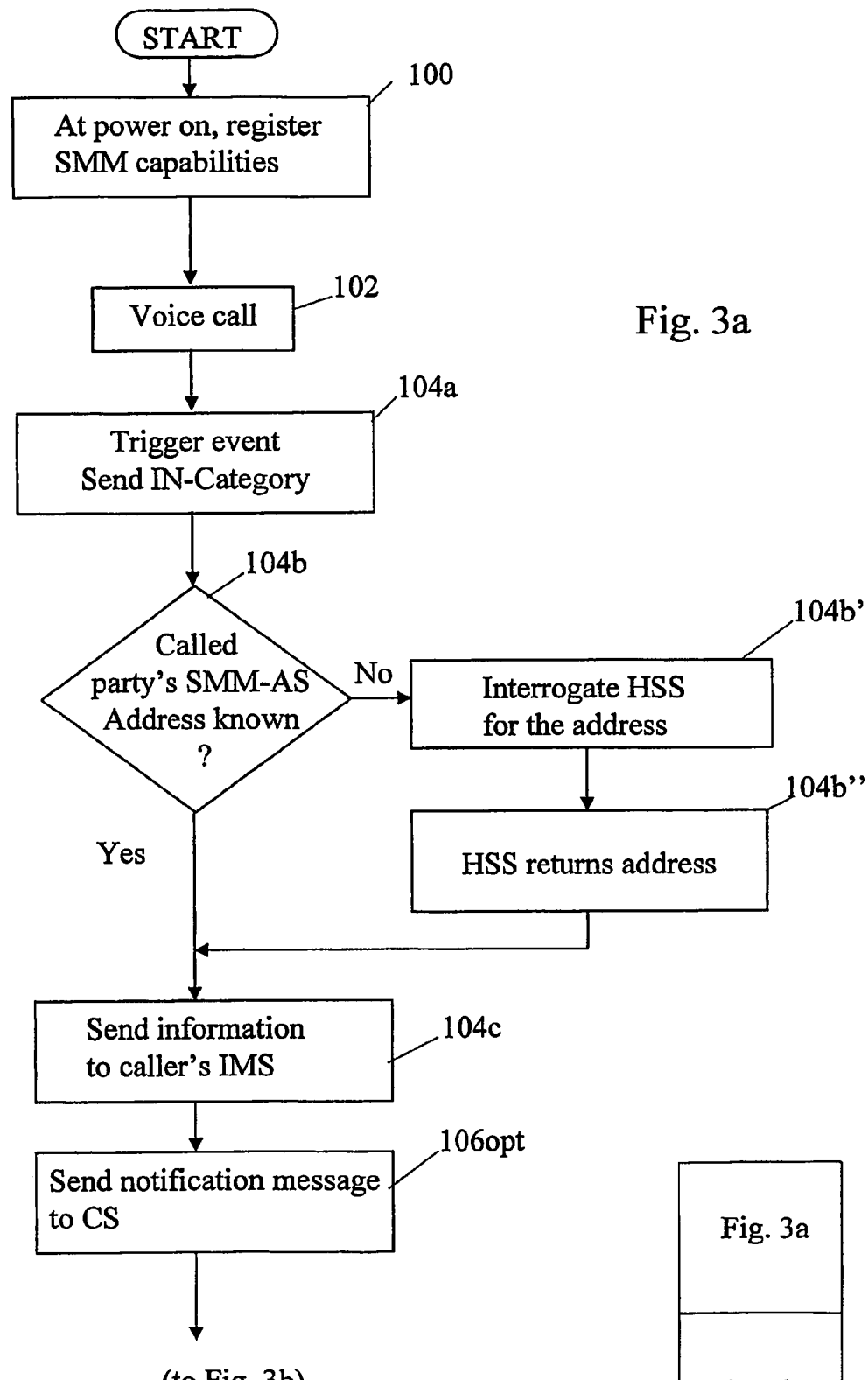

METHOD AND COMMUNICATION SYSTEM FOR AUTOMATICALLY DISCOVERING THE MULTIMEDIA SERVICE CAPABILITY

FIELD OF INVENTION

The present invention relates a method, a system, a server and computer program product for Multimedia services.

In particular, the invention relates to a method, a system and a server automatically discovering the Multimedia Service Capability, and computer program products according to said method.

BACKGROUND OF THE INVENTION

Multimedia services are foreseen to bring new revenues to the cellular operators running either or both 3G WCDMA and 2.5 G GSM networks. Since plain circuit voice will be an important source of revenue still for many years, the market is developing services 'beyond' voice. These are multimedia applications that includes a normal voice call but add another media in parallel to that speech call, so that the two mobile users can both talk and visually share another media at the same time. This shared media may be a still image, a 1-way live video, MMS, text or game. This type of shared services we herein call Shared Multimedia (SMM) services.

Shared multimedia services requires that a mobile phone is capable of running both a standard circuit switched voice call and a packet switched IP Multimedia session at the same time, besides hosting the client that makes up the application logic.

A highly wanted feature by operators is that mobile users can e.g. visually see from their phone display, which—if any, Shared Multimedia services that are applicable within the ongoing voice call. If the remote user and the calling user both have the capability to use one or several shared multimedia services, one or several icons could be enlightened in the display of both user's mobile phones. This type of capability check we herein call the shared multimedia capability discovery process.

However, the de-facto capability discovery solution discussed currently in standardisation, is oriented around letting the mobile phone initiate a packet switched based mobile capability check towards the remote mobile phone, just after the voice call has been established. This means that a capability discovery check will take place over the radio interface for all mobile-mobile calls, irrespective of whether or not the remote user has the SMM capability.

The problem lies with finding a mobile capability discovery method that is optimised from a radio resources perspective. Hence, the capability discovery process and results should only be passed over the radio interface when absolutely necessary and unavoidable. Thus, the capability discovery mechanism shall not be invoked in mobile-to-non-mobile voice calls, in mobile-to-not-multimedia-capable-mobile and it shall not be invoked for user's who are not allowed to use the service even though their mobile phones has the capability technically.

Terminal oriented solutions all have in common that one terminal, which has both packet switched and circuit switched connection in progress, has to query the other terminal if it supports any SMM services. This means that a query has to be initiated in the beginning of every phone call if one of the two terminals supports SMM. The probability that both terminals will support SMM will however be very low for many years.

Thus, one object of the present invention is to provide a method and a system for Multimedia Capability discovery that avoids unnecessary use of the radio interface.

SUMMARY

The above-mentioned object is achieved by a method, a system, a server and computer program product set forth in the characterizing part of the independent claims.

This solution avoid unnecessary use of the radio interface and is based on making use of the circuit switched network, e.g. the Intelligent network IN, as trigger to the packet switched network to find out about the calling as well as the called user's multimedia capabilities during a voice call. If there is a positive capability discovery result out of this for both users, the network will send a message to each of the two mobile phones that they should notify the users e.g. by displaying an icon above a soft button. It can be that the phone displays a shared multimedia-Image icon, if this was the only commonly supported capability of both users, up to a whole range of more or less complicated SMM services.

Preferred embodiments are set forth in the depending claims.

An advantage with the system and method according to the present invention is that the network operator gets more packet-switched traffic in the system due to it becomes easier for a user to start a shared multimedia application during an ongoing voice call. Voice call revenue may increase due to prolonged total voice call session thanks to the users sharing a media they can talk more about.

Yet another advantage is that the end-user gets clear information whether or not a shared multimedia application can be utilized in a mobile-to-mobile voice call or not.

Yet another advantage over the standard approach is that the scarce radio interface is not used for the discovery procedure.

Yet another advantage with the present invention is that the mobile phone is provided with information that makes it easy for the phone to enlighten what applications are indeed applicable or not during a voice call. This makes mobile phones look more attractive.

Yet another advantage is that the invention makes it more clear which multimedia services that are available to use, i.e. end-user satisfaction is increased.

BRIEF DESCRIPTION OF THE DRAWINGS

FIGS. 3a,3b is one flow chart (on two separate figure pages) illustrating a preferred embodiment of the invented method.

DETAILED DESCRIPTION OF PREFERRED EMBODIMENTS

Figure 1:
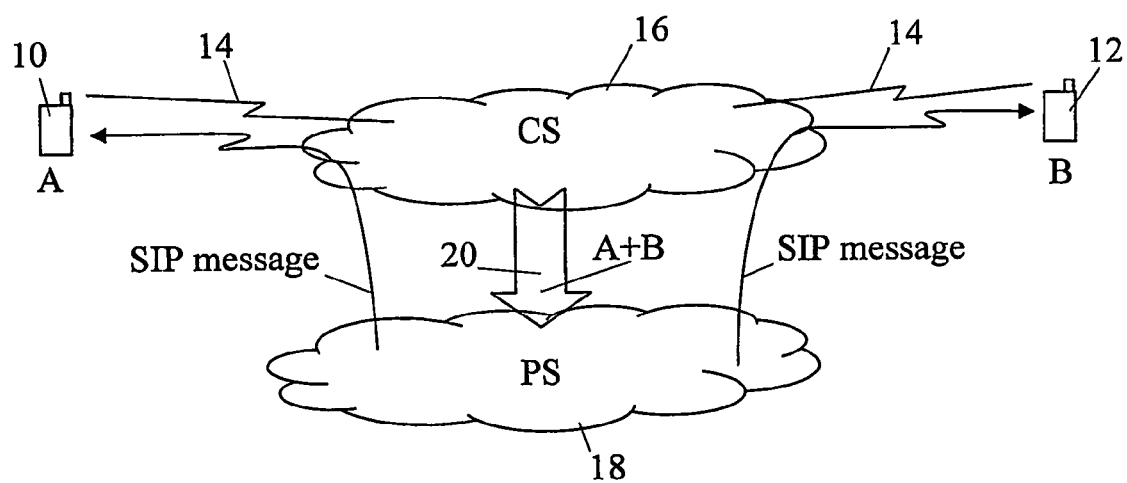
FIG. 1 is a schematic block diagram illustrating a system wherein the Multimedia Capability Discovery method according to the present invention is used.

FIG. 1 is a schematic block diagram illustrating a system wherein the Multimedia Capability Discovery method according to the present invention is used. One subscriber A has some kind of a user equipment, e.g. mobile phone, terminal, handy, cellular phone, communicator, personal organizer etc for calling a subscriber B, who also has a user equipment 12. The voice call will be set up over the air interfaces 14 and the radio communication network 16 for example a mobile cellular network. The radio communication network 16 is a circuit switched network CS. A packet switched network PS 18 provides on demand multimedia applications in parallel to voice calls, so that two users can both talk and visually share another media at the same time. This shared media may for example be a still image, for example a 1-way live video, text or game. This type of shared services are herein called Shared Multimedia (SMM) services. When a voice call is set up between two subscribers A and B, identifiers for the calling part A, e.g. a subscriber number such as the E.164 number, and identifiers for the called part B, e.g. the subscriber number, are paired and transferred from the circuit switched network to the packet switched network to find out about the common multimedia capabilities of the two users user equipment 10, 12. Subscriber data comprising Capability data is registered and stored in the packet switched network during user equipment power on. If there is a positive capability discovery result out of this for both users, the packet switched network will send a message to each of the two user's terminals 10,12 for notifying the users e.g. by displaying an icon above a soft button.

Figure 2A:
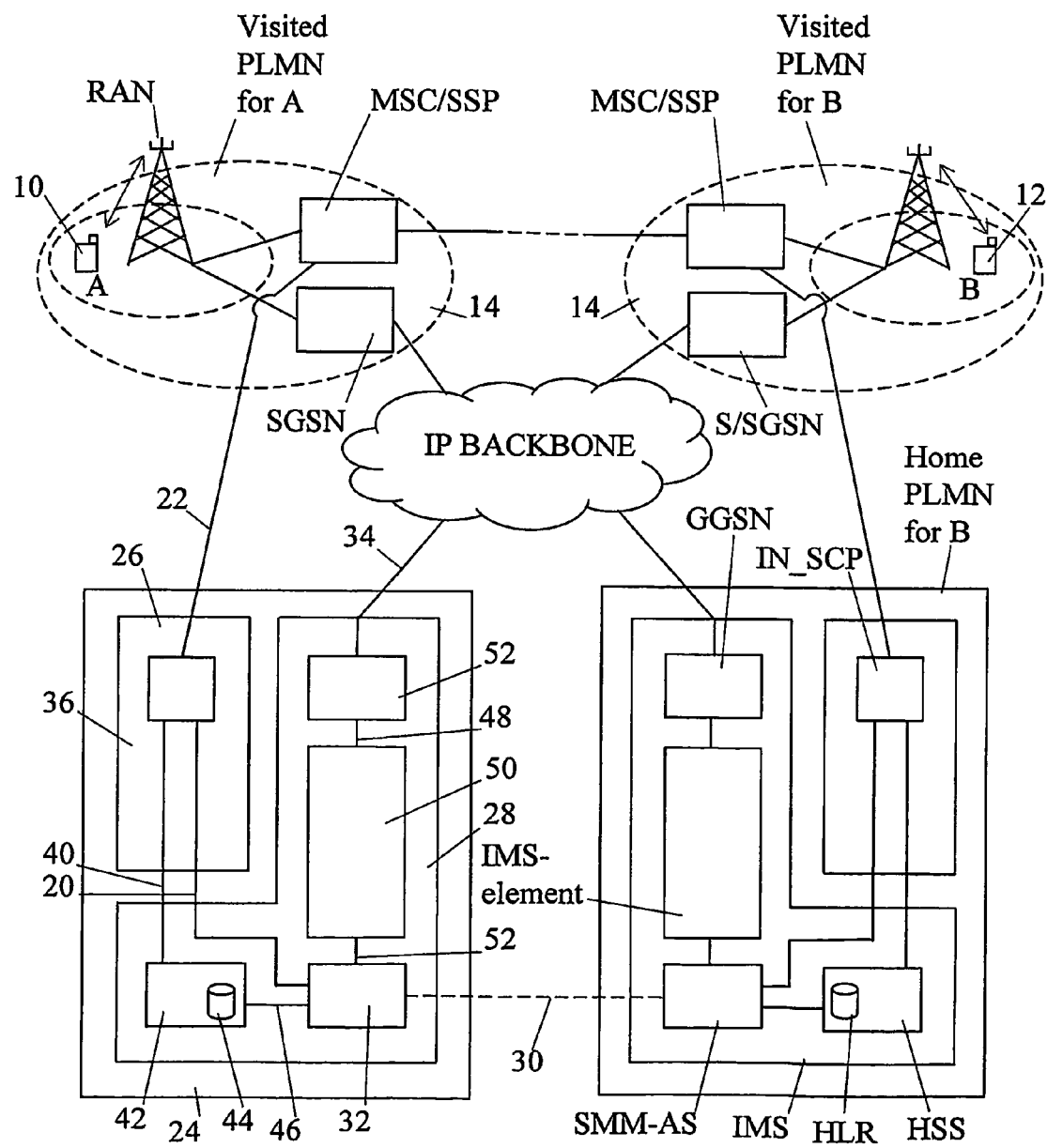
FIGS. 2a, 2b are block diagrams illustrating a system in more detail than FIG. 1, and in which system the preferred embodiment of the method is used.
Figure 2B:
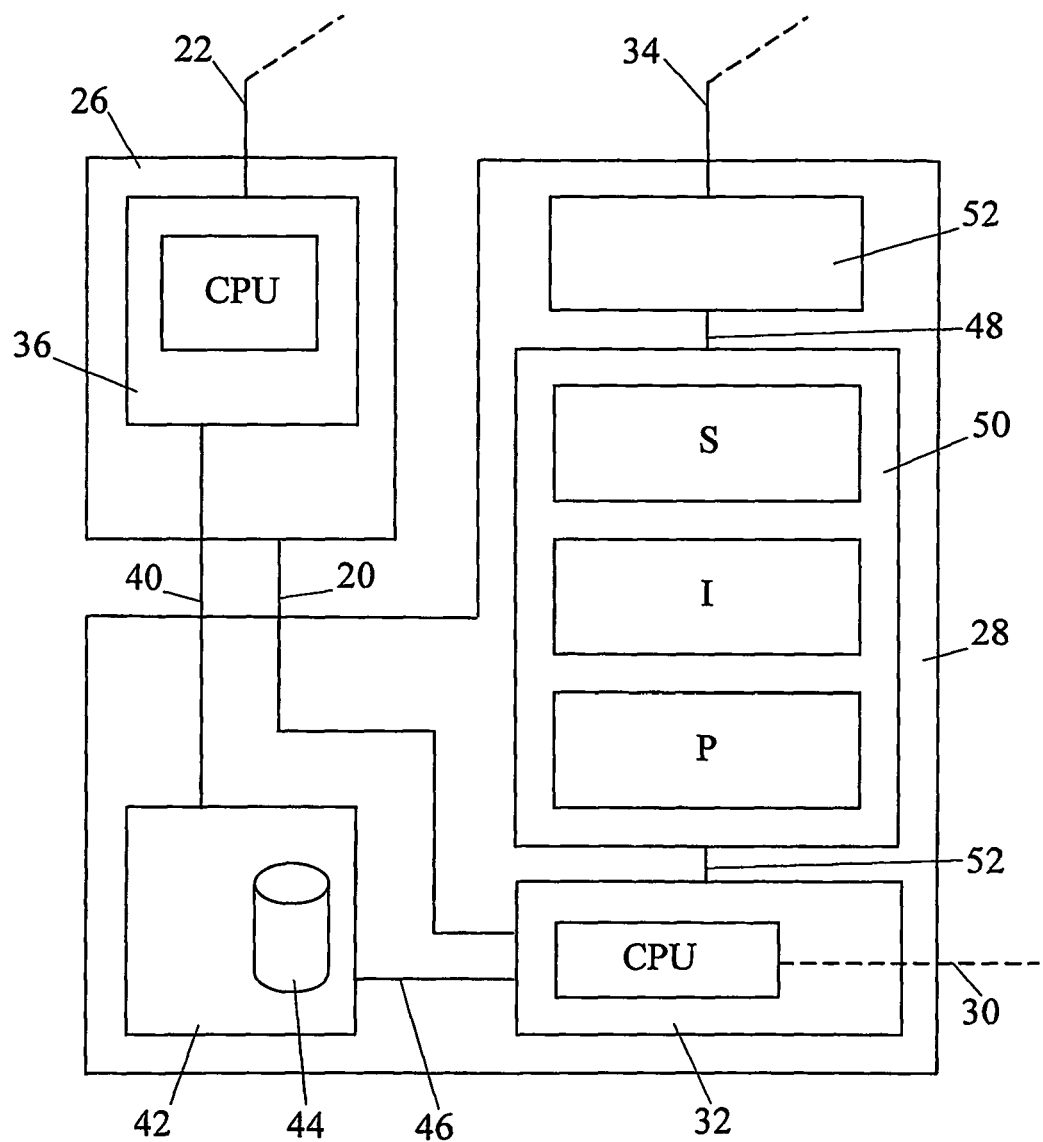

FIGS. 2a, 2b are block diagrams illustrating a system in more detail than FIG. 1, and in which system the preferred embodiment of the method is used.

The system comprises a mobile radio communication network system which is a part of a Public Land Mobile Network, PLMN. A PLMN comprises at least one Radio Access Network, RAN, and a Mobile Service Switching Centre/Service Switching Point, MSC/SSP node (may be separated in two different nodes), for controlling said RAN. These elements are considered to belong to the CS network. The RAN is also connected to an IP backbone, either via a Serving GPRS Support Node, abbreviated SGSN, or a GGSN node, Gateway GPRS Support Node. These elements are considered to belong to the PS network. Each subscriber's user equipment 10, 12 belongs to a certain PLMN, a so called Home-PLMN (HPLMN), in which the subscriber data and authentication data is registered in a Home Location Register database, HLR, of a Home Subscriber Server, HSS. Each subscriber may be in the HPLMN or temporary be visiting another PLMN, a Visited PLMN (VPLMN).

The HPLMN system 24 comprises a circuit switched network 16 (home CS, home IN), and a packet switched network 18, comprising at least one home packet switched network (home PS, home IMS) 28.

The home PLMN system 24 communicates over an interface 22 with MSC/SSP nodes, with IP backbone system over an interface 34 and with other PLMN systems over an interface 30.

The HPLMN circuit switched network (home CS) 26 comprises a node 36 that communicates over an interface 22 with MSC/SSP nodes. This node comprises a programmable control unit 38, e.g. server unit, microprocessor, PC, data processing unit, CPU, etc, and further necessary data storages, and I/O units (not shown). The node 36 may therefore be programmed to receive IN-Triggers, from MSC/SSP nodes and generate capability triggers, e.g. an IN-trigger corresponding to a capability query, to the HPLMN packet switched network over interface 20 or 40, which will be more described in conjunction with the description of the invented method. Home CS 26 may comprise other nodes, but these nodes are not of special interest here.

The network system 24 of an HPLMN may be implemented to involve an Intelligent Network IN and an IMS, i.e. IP Multimedia Core Network Subsystem or shorter IP Multimedia Subsystem (see the document 3$^{rd}$ Generation Partnership Project 3GPP TS 23.228 v6.3.0 (2003-09)). The home Intelligent Network, home_IN, corresponds then to the home CS 26. The home_IN comprises a node called home_IN Service Control Point node 36, abbreviated home_IN_SCP 36.

The Multimedia services is supported and controlled by said (home packet switched) IMS network 28, in this case denoted home-IMS instead of home PS. One of the nodes, the IMS-element node 50, acts on the control signalling flows and comprises at least one server having the Call State Control Function, P/I/S-CSCF. Other nodes in the IMS network is the above mentioned HSS node 42, a SIP Application server for Shared Multimedia Application, abbreviated SMM-AS 32, and a GGSN node 52. The GGSN (Gateway GPRS Support Node) node 52 is a node interfacing the IMS with the IP backbone via an interface 34, which is connected to the Serving GPRS Support Node, abbreviated SGSN, that connects the RAN and IP backbone. Further, there is an interface 30 between the IMS core networks of the caller A, the calling party, and the called user B, called party. Further, there is an interface between HSS 42 and the SMM-AS 32, an interface 52 between the SMM-AS 32 and the IMS element 50, and an interface 48 between the IMS-element 50 and GGSN 52. The interface 20 is also a communication path between the node 36 (home IN SCP).

IP Multimedia Subsystem, IMS, is an architecture for offering services on the packet domain, whereby the network, i.e. operator, is aware of the service and as a result controls the service. IMS is the convergence of the wireless and the internet worlds. It harnesses the flexibility of Internet based protocols and solutions which enable multimedia communications and applies to the wireless technologies. The application to the wireless world gains from the traditional mobile network technologies having quality and reliability.

Some of the above mentioned IMS network nodes and their function of the IMS will now be described more detailed.

The HSS 42, Home Subscriber Server, is the main database. This element is an evolution of the HLR, Home location Register, element. The HSS 42 contains the features of the HLR (subscriber data and authentication data) and other functions like Location Register and IMS Service Profile Processing and IMS Subscription and Authentication Data.

The IMS control nodes S-CSCF, P-CSCF and I-CSCF are illustrated as one single node, hereafter referred to as the IMS-element 50. Said control functions may be stored and run on one single server. The different roles and behaviour of the will now be described briefly.

The P-CSCF, Proxy-CSCF, is the entry point towards the IMS network from any access network. The assignment of a P-CSCF to a user is determined by the access network configuration. In the case of UMTS/GPRS the allocation takes place at PDP context activation, where the User Equipment UE, may use a DHCP (Dynamic Host Configuration Protocol) query to obtain the list of P-CSCFs or the UE is provided the IP address of the P-CSCF by the GGSN in the PDP activation message. During roaming the P-CSCF is in the home network when the roaming configuration is the 'home GGSN' and in the visited network for the 'visited GGSN'.

The P-CSCF is used by both the home network and visited network. All service signalling in the home or visited network must pass through P-CSCF. The P-CSCF will work as a Stateful SIP proxy and all signalling flows between the user and the IMS system will be routed through the P-CSCF. The P-CSCF will also enforce the routing of signalling messages to pass through the users home network. Said server can also act on behalf of the user, for example terminate an ongoing session or redirect an ongoing session.

This node will be the responsible of routing the SIP registration query towards the corresponding I-CSCF (Interrogating-CSCF), base on the domain address in the requested URI for the user registration request. After the registration procedure, the P-CSCF will maintain the knowledge of the 'SIP Server' (the serving S-CSCF, located in the home network) associated to the user, and will forward all requests from the user toward it.

As the P-CSCF is the entry point of the access network, access network peculiarities are handled by the P-CSCF. Furthermore, said node may modify the service request from the user to suit the capabilities of the access network.

The S-CSCF is the node that performs the session management within the IMS network for the UE and can operate in a stateful manner. The S-CSCF also ensures end-to-end reach ability for users and services by interacting with other S-CSCFs, SIP servers and application servers. This is facilitated by the handling of the user's registration on to the IMS network. The S-CSCF also authenticates the user on behalf of the IMS.

The S-CSCF is the main control point for services, from the operator's point of view. The S-CSCF enforces the rule set for services based on the general policy of the operator and the users subscription parameters. The S-CSCF may reject a service request or modify it according the above factors.

S-CSCF decides on the handling of service requests from the user based on the filter criteria for the user. Where the services of an application server is required to complete the requested service, the S-CSCF will forward the request to the appropriate application server either based on the user's profile provided by the HSS 42 at registration or based on the operator's local policy.

The S-CSCF, in the home domain network, is responsible for all session control, but it could forward the specific request to a P-CSCF in the visited domain network based on the requirements of the request. For example, the visited network is better positioned to support the local dialing plan or local service.

The management of the S-CSCFs in the IMS network is dynamic and the HSS 42 can allocate the S-CSCF for a user dynamically. The S-CSCF may be chosen based on the services requested or the capabilities of a mobile.

One essential advantage of this architecture is that the HPLMN network provides the services and service features. This means that the user's configurations are always the same with respect to services and implicitly it is always in its home environment. Furthermore the user is not restricted to the capabilities of the VPLMN IMS network as is seen in the current wireless network i.e. if an MSC does not support a feature that a user has subscribed to, the user is limited by the visit access network capabilities.

The S-CSCF will host the service execution either locally and/or via a standardized interface to an external service platform, i.e. application server, the IP Multimedia Subsystem Service Control (ISC) interface. The set of call control services supported on the S-CSCF (and P-CSCF) will evolve over time. If it does not provide a required service locally, it will invoke services externally, for instance on a SIP Application Server over ISC.

The S-CSCF performs registration for the client and interacts with the HSS using AAA/Diameter protocols to obtain relevant subscriber profile and validation information etc in order to authenticate, register and service the client requests.

It provides appropriate routing support for routing of signalling messages. It also modifies the route information to ensure all signalling messages related to the service go through the S-CSCF. For an end-to-end SIP session, the S-CSCF determines the network operator of the destination and locates the I-CSCF to use for setting up communication with that network.

The I-CSCF is the first point of contact within the home network for a visited network or external network. It's primary function is the query of the HSS to discover the S-CSCF for handling the incoming session request. The functionality is similar to that of a gateway MSC. This is an optional node in the IMS architecture, where the system could be configured such that the P-CSCF contacts the S-CSCF directly.

For a user registration request, in conjunction with HSS based data, I-CSCF identifies the S-CSCF with which the user is to be registered. For an incoming SIP request, the I-CSCF retrieves from the HSS the identification of the S-CSCF that will host the execution environment for that user and route all SIP messages to that S-CSCF for that session.

The I-CSCF may act as a gateway into a home network's IM subsystem, in order to mask the internal configuration of the home network's environment from external interrogating devices.

The SMM-AS node 32 is an SIP Application Server hosting the logic of the Shared Multimedia application. The server is able to control the session and apply a defined service. This node is proxied by the S-CSCF and will be able to:

Accept requests for service. It will be able to control, finish or initiate a new SIP transaction (for example forking, new session, messaging sending . . . );

Route the session towards another user or network;

Interaction with other service platforms for the support of services. This interface will not be a SIP interface.

In order to apply the established service logic, the application server is able to communicate with another node like external databases or another network node.

SIP stands for Session Initiation Protocol. It's a protocol defined by IETF as a generic session management protocol. The protocol is a text based expandable protocol, which is designed to support a wide range of services with varying degrees of complexity. Most importantly, SIP enables the integration of these wide range of services.

SIP makes minimal assumptions on the underlying transport protocol, IP. It can use either User Datagram Protocol, UDP, or Transport Control Protocol, TCP, or Stream Control Transmission Protocol, SCTP, as a transport mechanism. A SIP message body contains a Session Description Protocol (SDP) block that describes the contents of the session.

The different described elements will be better understood in the following description of the preferred embodiments of the invention.

First, an embodiment of the invented method is briefly described.

The start requirement according to the following embodiment is that the operator provides the user/subscriber with the SMM service and an IN service.

At power on, the user equipment, e.g. a mobile phone, registers its SMM capabilities to IMS. Then, upon call set up or B-answer, the IN network gets informed and can notify IMS, which checks the calling and the called/connected user's SMM capabilities. If matching SMM capabilities for the users is found, IMS sends a SMM-notification message over the packet network to each of the mobile phones. When the notification message is received by the mobile phone enlightens an SMM icon or equivalent. Any of the users activates SMM by pressing the soft button or equivalent.

Figure 3B:
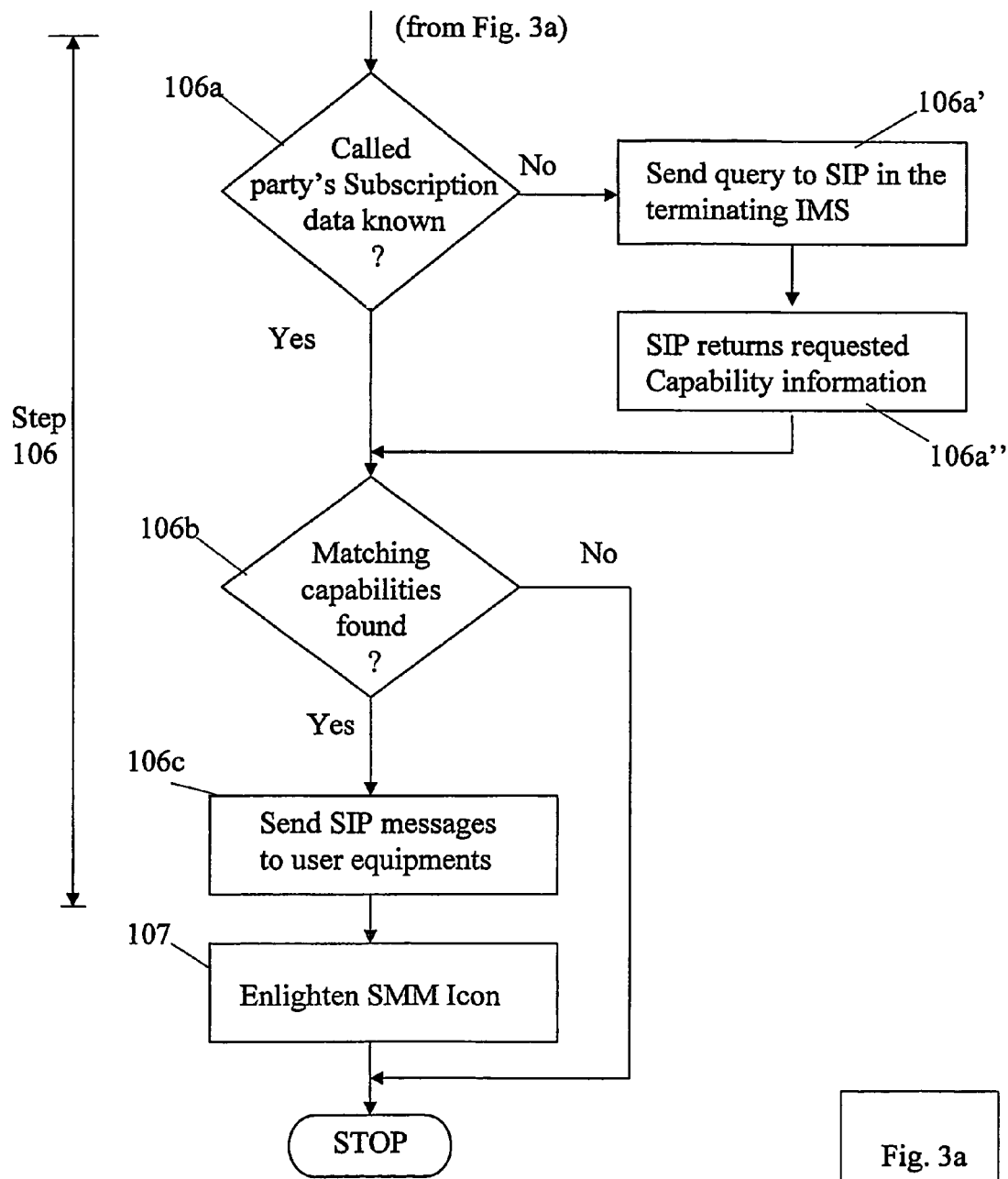

A preferred embodiment of the invented method for automatically discovering the common Multimedia Service Capability of two user equipments when initiating a voice call between the two parties will be described in detail hereafter with reference to FIGS. 3a and 3b, which is one flow chart (on two separate figure pages) illustrating a preferred embodiment of the invented method. One of the user equipments, which is belonging to a calling party (A-user or A-subscriber) registered in a home PLMN, is capable of running simultaneously both a standard circuit voice call in a circuit switched network, comprising at least one home circuit switched network (home IN), and a packet switched IP Multimedia session supported by a packet switched network, comprising at least one home packet switched network (home IMS), and one called party (B-user or B-subscriber) user equipment, which Multimedia Capability may be unknown to the calling party, and for discovering matching Multimedia Service Capability of the two user equipments when initiating a voice call over the circuit switched network to the other user equipment.

At the subscription, the operator can set in HLR 44 an originating IN category on the users that are subscribing to any SMM service, e.g. SMM-Image, as well as an Access Point Name, APN, used for IMS.

The operator also sets an IMS subscription in HSS 42 and can also set a specific SMM subscription, e.g. SMM-Image. Subscription data can be set in the SMM-Application Server interfacing the IMS core network as well.

At power on, step 100, the originating IN-category is sent to the visited MSC where the user currently is roaming (either within the home network or in a foreign operator's network) when the user makes IMSI (International Mobile Subscriber identifier) Attach in the MSC Service Area for the first time.

The user's mobile phone makes a PDP (Packet Data Protocol) Context Activation toward the APN (Access Point Name) used for IMS directly after power on. The PDP context has to be active as long as the phone is attached to the network. In IMS, all services are delivered through a single IMS APN, with the right bearer supporting the service and the control of the bearer based on the service.

The terminal registers its supported SMM capabilities in the SIP registration procedure towards the IMS element 50. This is done directly after the PDP Context activation and will remain valid until the phone is powered off again.

The active part of the procedure for discovering Multimedia Capability is initiated automatically when the served subscriber makes a circuit voice call, step 102.

In the next step, step 104, a node 36 of the calling party's home circuit switched network 26 (home IN, home CS) sends simultaneously a capability request for the two subscribers from said circuit switched network 26 to the home packet switched network 28 (home PS, home IMS) supporting the IP Multimedia service.

The step 104 may comprise a set of sub-steps. In the following, node 36 is denoted home IN-SCP node, the calling party's home packet switched network 28 (home PS, home IMS) is denoted originating IMS network and the called party's home packet switched network is denoted terminating network.

In step 104a, the visited MSC/SSP (service switching point) node will notice a trigger event and after analysis of said originating IN category, send information to the home IN-SCP node 36 that a originated voice call is being set up. The trigger event can be based on either "Set-up" or "Answer" depending on if the operator wants the discovery procedure to be started during call set-up or after the connected party has answered. This interface between the MSC/SSP and the home IN-SCP 36 can be any standardised IN protocol such as CAP (CAMEL Application Part, wherein CAMEL is an abbreviation for Customised Application Mobile Enhanced Logic) or CS-1.

In the next step when the receiving IN-SCP node 36 of the caller gets the indication, the IN-trigger, from the SSP that the served user is making an originated CS (Circuit Switched) call, step 104b, the control unit, which is a data processing unit of the IN-SCP node, has to decide if the HSS 42 has to be interrogated for the address, for example IP address, to the calling party's SMM Application Server 32, SMM-AS, because said address is missing. If the address is known, i.e. "yes", go to step 104c. If the address is not known, i.e. "no", step 104b' will follow, in which the IN SCP node 36 interrogates the HSS 42 for said address information. The HSS 42 responds and sends the address information of the calling party's SMM-AS 32 back to the SCP node 36, step 104b". The SCP node 36 passes a notification message, e.g. an Originated-Call notification or an Answer-notification message, in step 104c, to the SMM-AS node 32 of the caller in the caller's IMS network 28. The E.164 numbers of both the calling and the called/connected user are included in the notification message. The originated-call indication and the E.164 numbers can be expressed in an XML data structure. The message protocol can be any standard IETF protocol, e.g. HTTP. Sub-step 104c ends this step 104 and completes this set of sub-steps.

Now the next step is performed, step 106, in which the packet switched network is responding simultaneously to said user equipment information regarding matching Multimedia Capability, if at least one matching service is found.

The step 106 comprise a set of sub-steps.

As an optional step, step 106 opt, when the SMM-AS 32 has received the SCP notification, it can confirm back to the IN-SCP 36 that it has successfully been received. The originating IN-SCP 36 can then respond back to the serving MSC/SSP, which continues the call set up. No more IN-related actions need necessarily be taken.

In step 106a, the SMM-AS 32 as above may check for the calling party's subscription data. If the called party does not belong to the same home domain and the same IMS network 28, "No", the SMM-AS 32 can proceed, step 106a', by sending a capability question towards the home domain IMS-Element, node and SMM-AS of the called party B, wherein the called party B is registered. Said capability question is either a general capability query, or a specific Shared Multimedia capability query. This capability query may be utilized by a SIP OPTIONS message, according the IETF standard RFC 3261.

The SIP OPTIONS message (as all SIP messages as a matter of fact) requires a SIP-user identity in order to be routable to the terminating network. For this reason the originating IMS network 28 has to derive a SIP-URI (Universal Resource Identifier) from the called/connected party's E.164 number first. The number-to-SIP address conversion can be made by an ENUM-server.

The SIP OPTIONS message can be addressed to the IMS-element 50 of the terminating IMS network. The message can include the called/connected user's identity and a special SMM services support indicator. The latter is set if the AS wants the terminating IMS-element to understand SMM services in order to respond with any capability information at all (also knows as the SIP 'accept-contact' header).

In step 106", the terminating IMS network returns all of the called/connected user's capability information, or just those related to the SMM services which required support according to the original capability query, to the originating IMS network. Said response can be returned in a SIP 200 OK message.

The Multimedia capability information of the calling party and the called party is analysed by comparison, matching of Shared Multimedia services of the two parties. This analysis is performed in step 106b, by the originating IMS network by the SMM-AS 32. If there is at least one matching capability for e.g. SMM-Image, then the SMM-AS 32 is able to send, in step 106c, one SIP MESSAGE to each of the user equipments via each of the caller's and called party's separate (if they are separate) packet switched networks, that is the IMS core network, IP backbone and radio networks.

If there is no capability match found ("No" in step 106b) by the IMS network, the network does not send any capability information in any SIP MESSAGE or other message.

Sub-step 106c ends this step 106 and completes this set of sub-steps.

The SMM-AS could send the capability information included in the SIP MESSAGE by means of a special SMM-Image feature tag to be understood by the receiving mobile phones. The two users are notified, step 107, that this particular service is now available to use by an SMM-Image icon or equivalent on the user equipments display. When the user sees the SMM-image icon or equivalent, the user may press for example a soft button underneath an SMM-icon, to send the image e.g. in JPEG format, towards the remote user of the ongoing voice call. Hence, if no icon related to SMM-services are enlightened, the two parties can't establish a wished Multimode service session. The Icon is only an example, equivalent user notification such as sounds, enlightened key on a key board, etc may be used as well.

A system according to the invention comprises a method for automatically discovering the common Multimedia Service Capability as set forth in claims 1-5. The system comprises following means:

a. Means for receiving from means in the circuit switched network simultaneously a capability request for the two user equipments (10,12) to the packet switched network supporting the shared Multimedia service, SMM service;

b. Means for analysing the capability request by means in the packet switched network;

c. Means for responding to said user equipments (10,12) information regarding matching SMM Capability, if at least one matching service is found.

Further, the system according to the invention comprises means listed in the dependent claims 7-10.

The invention also relates to a server (32) provided in a node of a system according to claim 6, is characterized in that it comprises:

a. Means for receiving from means in the circuit switched network simultaneously a capability request for the two user equipments (10,12) to the packet switched network supporting the shared Multimedia service, SMM service;

b. Means for analysing the capability request in the packet switched network;

a. Means for responding simultaneously to said user equipments (10,12) information regarding matching SMM Capability, if at least one matching service is found.

Further, the server according to the invention comprises means listed in the dependent claims 12-14.

Said means for receiving, analysing and responding, in a., b. and c. above, is implemented as software program code and is loadable into control unit, server unit, PC, microprocessor, Central Processor Unit CPU etc. The method is possible to implement by means of a computer program comprising the software code means for performing the steps of the method.

Figure 4:
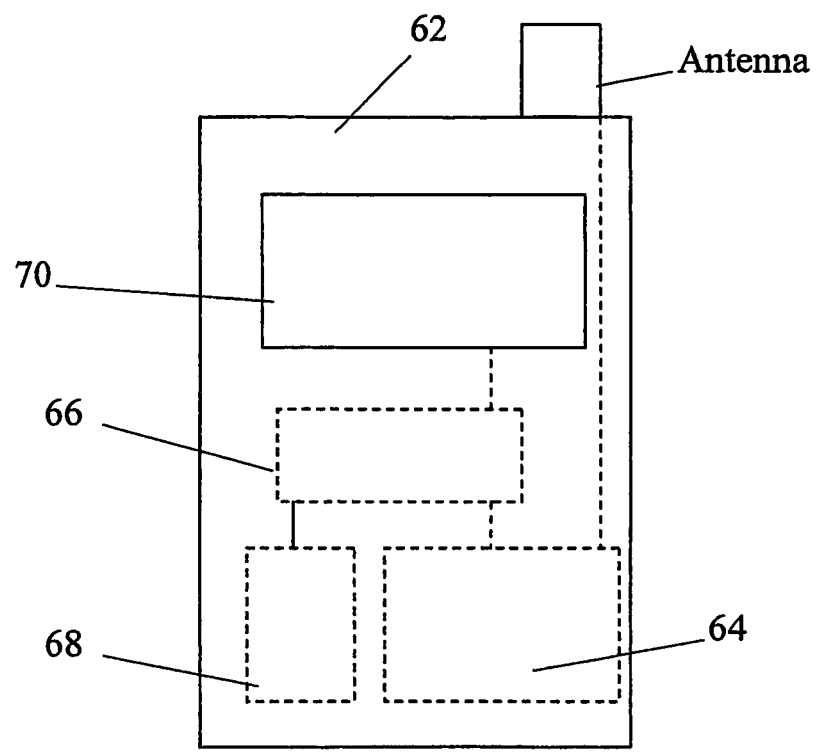
FIG. 4 is a block scheme illustrating very schematically one user equipment.

FIG. 4 is a block scheme illustrating very schematically an user equipment 60, in this case a terminal or mobile phone. This terminal 60 comprises a housing 62 within which a radio unit 64 for signalling, and transmitting and receiving voice calls and data information over the air interface (14) to a mobile radio communication network, RAN. The radio unit 64 is connected to and controlled by a control unit 66, which is a microprocessor, CPU, etc. A data storage means 68 is connected to the control unit for storing data and software program code to software program for controlling the control unit 66 and the terminal 60. The illustrated data storage means 68 represents many different kinds of storages like ROM, RAM, EPROM, etc, usually used in ordinary terminals. In said data storage means 68 is loaded and stored User Agents for different services like WAP Push messages, MMS, Multimedia Capability, SIP etc. The User Agents are clients, i.e. software programs, a kind of plug-ins that is automatically alerted when the control unit 66 identifies a corresponding incoming service. For the SIP protocol handling is a SIP Stack provided. The terminal 60 is also provided with a Man-Machine-Interface, MMI, a display 70 connected to the control unit 66 for showing different information. The display 70 may be able to show soft button that when touch can activate a software application stored in said data storage means 68. The different units of the terminal 60 is powered by at least one battery (not shown).

In order to receive the SIP MESSAGE, each mobile phone shall have an active packet PDP context since the time of the SIP Registration. The mobile platform can forward the received information onto the SMM-image client, which can decide how to display the SMM-image information to the user e.g. visually.

The method may be implemented by means of a computer program product comprising the software code means for performing the steps of the method. The computer program product is run on processing means within a network element, or in a separate element connected to a network element. The computer program is loaded directly or from a computer readable medium.

The triggering could also be performed by other means in the CS network/domain, like example by use of Parlay (see for example www.parlay.org). The triggering could be made both in the called and in the calling subscriber's CS-network/domain.

In the described embodiment above, the E.164 number have been used as an subscriber identity, but other subscriber or terminal related information, such as IMEI, IMSI, or IP addresses may be used as well as identity for a subscriber.

The present invention is not limited to the above-described preferred embodiments. Various alternatives, modifications and equivalents may be used. Therefore, the above embodiments should not be taken as limiting the scope of the invention, which is defined by the appending claims.

What is claimed is:

1. A method of minimizing a number of messages sent over a radio interface between a wireless communication network and first and second mobile User Equipments (UEs) by automatically discovering a shared multimedia (SMM) service capability of the two UEs, wherein the wireless communication network includes a circuit-switched network supporting voice calls and a packet-switched network supporting multimedia services, the method comprising the steps of:

storing in the packet-switched network, the SMM service capabilities of the first and second UEs when each UE powers on;

setting up a voice call from the first UE to the second UE in the circuit-switched network;

automatically sending from the circuit-switched network to the packet-switched network, a request for the SMM service capabilities of the first and second UEs upon detecting a triggering event;

retrieving by the packet-switched network, the stored SMM service capabilities of the first and second UEs;

determining whether the first and second UEs have matching SMM service capabilities;

when the first and second UEs have no matching SMM service capabilities, taking no further action; and when the first and second UEs have matching SMM service capabilities, sending an SMM-Notification message from the packet-switched network to the first and second UEs indicating that the first and second UEs have matching SMM service capabilities, wherein the SMM-Notification message includes an SMM-Image feature tag understood by the first and second UEs and causing the UEs to display a notification enabling each user to send the notification to the other user to initiate an identified SMM service;

wherein the first and second UEs learn of matching SMM service capabilities without having to send a request for SMM service capabilities over the radio interface.

2. The method according to claim 1, wherein the step of automatically sending the request for the SMM service capabilities upon detecting a triggering event includes sending the request upon detecting that a user of the second UE has answered the call.

3. The method according to claim 1, wherein the steps of retrieving the stored SMM capabilities, determining whether the first and second UEs have matching SMM service capabilities, and sending an SMM-Notification message are performed by a Session Initiation Protocol (SIP) Application Server for Shared Multimedia Services (SMM-AS).

4. The method according to claim 1, wherein the step of sending the SMM-Notification message includes sending the SMM-Notification message to the first and second UEs as a Session Initiation Protocol (SIP) message.

5. The method according to claim 1, wherein the step of automatically sending the request for the SMM service capabilities from the circuit-switched network includes automatically generating the request utilizing Intelligent Network (IN) technology or Parlay technology.

6. The method according to claim 1, further comprising providing by the first and second UEs, an indication to users of the UEs that the first and second UEs have matching SMM service capabilities.

7. A system for minimizing a number of messages sent over a radio interface between a wireless communication network and first and second mobile User Equipments (UEs) by automatically discovering a shared multimedia (SMM) service capability of the two UEs, wherein the wireless communication network includes a circuit-switched network supporting voice calls and a packet-switched network supporting multimedia services, the system comprising:

a database in the packet-switched network for storing the SMM service capabilities of the first and second UEs when each UE powers on;

call setup means in the circuit-switched network for setting up a voice call from the first UE to the second UE;

means for automatically sending from the circuit-switched network to the packet-switched network, a request for the SMM service capabilities of the first and second UEs upon detecting a triggering event;

means within the packet-switched network for retrieving the stored SMM service capabilities of the first and second UEs and for determining whether the first and second UEs have matching SMM service capabilities; and means for sending an SMM-Notification message from the packet-switched network to the first and second UEs indicating that the first and second UEs have matching SMM service capabilities, responsive to a determination that the first and second UEs have matching SMM service capabilities, wherein the SMM-Notification message includes an SMM-Image feature tag understood by the first and second UEs and causing the UEs to display a notification enabling each user to send the notification to the other user to initiate an identified SMM service;

wherein the first and second UEs learn of matching SMM service capabilities without having to send a request for SMM service capabilities over the radio interface.

8. The system according to claim 7, wherein the means for automatically sending the request for the SMM service capabilities upon detecting a triggering event sends the request upon detecting that a user of the second UE has answered the call.

9. The system according to claim 7, wherein the means within the packet-switched network for retrieving the stored SMM service capabilities of the first and second UEs and for determining whether the first and second UEs have matching SMM service capabilities is a Session Initiation Protocol (SIP) Application Server for Shared Multimedia Services (SMM-AS).

10. The system according to claim 7, wherein the SMM-Notification message is a Session Initiation Protocol (SIP) message.

11. The system according to claim 7, wherein the circuit-switched network includes means for automatically sending the request for the SMM service capabilities utilizing Intelligent Network (IN) technology or Parlay technology.

12. The system according to claim 7, further comprising means within the first and second UEs, for providing an indication to users of the UEs that the first and second UEs have matching SMM service capabilities.

13. A server in a system for minimizing a number of messages sent over a radio interface between a wireless communication network and first and second mobile User Equipments (UEs) by automatically discovering a shared multimedia (SMM) service capability of the two UEs, wherein the wireless communication network includes a circuit-switched network supporting voice calls and a packet-switched network supporting multimedia services, and the server is implemented in the packet-switched network, the server comprising:

means for receiving from the circuit-switched network, an automatically request for the SMM service capabilities of the first and second UEs;

means for retrieving from a database, the stored SMM service capabilities of the first and second UEs;

means for analyzing the SMM service capabilities of the first and second UEs to determine whether the first and second UEs have matching SMM service capabilities; and means for sending an SMM-Notification message to the first and second UEs indicating that the first and second UEs have matching SMM service capabilities, responsive to a determination that the first and second UEs have matching SMM service capabilities, wherein the SMM-Notification message includes an SMM-Image feature tag understood by the first and second UEs and causing the UEs to display a notification enabling each user to send the notification to the other user to initiate an identified SMM service;
wherein the first and second UEs learn of matching SMM service capabilities without having to send a request for SMM service capabilities over the radio interface.

14. The server according to claim 13, wherein the server is a Session Initiation Protocol (SIP) Application Server for Shared Multimedia Services (SMM-AS).

15. The server according to claim 13, wherein the SMM-Notification message is a Session Initiation Protocol (SIP) message.

16. The server of claim 13, further comprising a processor and a computer usable medium for storing computer program instructions, wherein the processor controls the receiving, retrieving, analyzing, and sending means when the processor executes the computer program instructions.

* * * * *